J. W. BOPE.
Dumping Platform for Harvesters.
No. 76,703. Patented April 14, 1868.
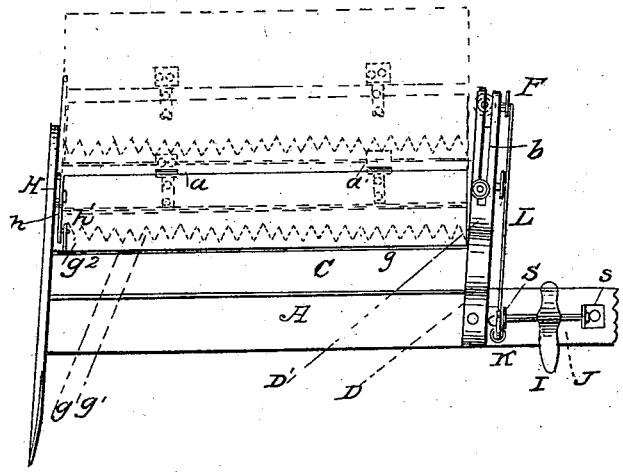
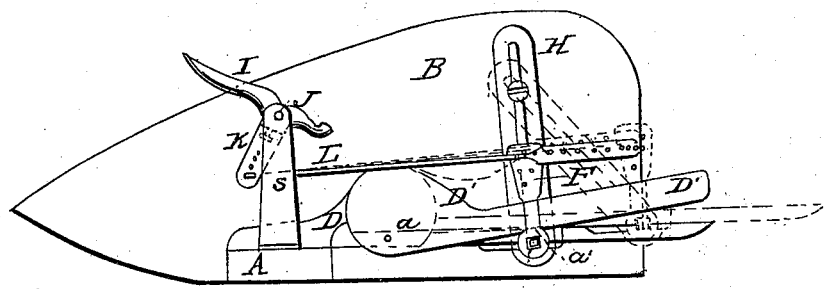
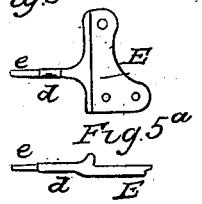
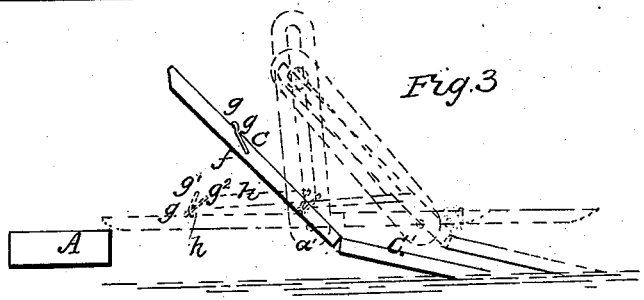
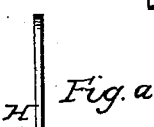

:::center
United States Patent Office.
:::

JACOB W. BOPE, OF ST. LOUIS, MISSOURI, ASSIGNOR TO HIMSELF AND GEORGE R. CHITTENDEN, OF CHICAGO, ILLINOIS.

:::center
Letters Patent No. 76,703, dated April 14, 1868; antedated April 7, 1868.
:::

:::center
IMPROVEMENT IN DUMPING-PLATFORMS FOR HARVESTERS.
:::

:::center
The Schedule referred to in these Letters Patent and making part of the same.
:::

TO ALL WHOM IT MAY CONCERN:

Be it known that I, JACOB W. BOPE, of St. Louis, county of St. Louis, and State of Missouri, have invented a new and useful Improvement in "Droppers for Harvesters;" and I do hereby declare that the following is a full, clear, and exact description of the construction and operation of the same, reference being had to the annexed drawings, making a part of this specification, in which—

Figure 1 is a plan or top view of so much of a harvesting-machine as is necessary to show my improvements.

Figure 2 is a side elevation taken from the machine side of the platform

Figures 3 and 4 are diagrams, showing the different positions of the tilting-platform; and Figures 5 $5^a$ and 6 $6^a$ represent details of construction hereinafter explained.

Similar letters of reference indicate corresponding parts in the several figures.

My invention consists in providing a tilting-platform, which turns upon a pivot, at or near its rear edge, with a hinged folding extension or tail-piece for adapting said platform for use in tall grain; it also consists in the employment of means, whereby the tilting-platform may be adjusted in its angle of relation to the ground, and also, whereby it may be set nearer to or further from the cutters, in such manner as to adapt said platform to the work to be performed, and to the nature of the ground over which it passes; it further consists in the employment, in connection with the hinged folding extension or tail-piece, of an anti-friction rod or guard, as hereinafter explained; and it further consists in an arrangement of levers and connecting-rods for operating with a positive movement, in both directions, a tilting-platform which is arranged to turn upon a pivot or fulcrum at or near its rear edge, as hereinafter explained.

To enable others to understand and use my invention, I will describe the same with reference to the drawings, in which—

A represents the finger-bar of a harvester, and B the outer dividing or separating-board, which may be of any usual construction. C is the tilting-platform, arranged to turn upon a fulcrum or pivot at or near its rear edge, as shown at $a$, figs. 2, 3, and 4, and having its support at the outer end in the dividing-board B, or in an arm extending therefrom, or from the finger-bar, and at its inner end in the jointed arm D D', which at its forward end is rigidly connected to the finger-bar. The arm D is provided at its rear end with a vertical disk or circular face matching a corresponding disk or face on the forward end of arm D', and connected thereto by a central bolt or pivot, upon which the part or arm D' may be turned to adjust its angle of relation to the part D, and to the surface of the ground. These disks or faces may be provided with radial ribs and grooves, and with a set-screw in one working through a slot in the other, in such manner that the arm D' may be readily adjusted and securely held at any desired angle to arm D; or instead of the slot and set-screw, simply perforations in the disks, through which a pin is passed to secure the parts when properly adjusted, may be employed, as shown at $a$, fig. 2. The arm D' has a vertical slot, $b$, formed in it to receive and admit of the adjustment of the vertical rod, which forms the support for the pivot at the inner end of the platform. Said rod is provided with a head or nut at its upper end to properly support it, and at its lower end with an eye or coil, through which the pivot at the inner end of the platform passes. Said pivot consists of a small casting, shown at E, figs. 5 and $5^a$, bolted or otherwise firmly secured to the inner end of the platform, at or near its rear edge, and of the pin or shaft $d$ provided with a square end, $e$, to receive and cause it and the platform to which it is connected to turn with the lever or arm F, by means of which said platform is tilted, as hereinafter explained. G, figs. 6 $6^a$, is a similar casting bolted to and forming the pivotal support for the outer end of the platform, located in line with the pivot or casting E. Said casting or pivot is provided with a hooked end, which is passed through an eye or perforation in a slotted adjustable arm or support, H, in such manner as to prevent its accidental withdrawal when the platform is in working position. The slotted arm H is connected to the dividing-board by a set-screw, which allows a vertical or a vibratory adjustment of the slotted arm thereon, as shown in fig. 2. I is a treadle, constructed in form shown in figs. 1 and 2, and connected by a set-screw to a rock-shaft, J, having its bearings in uprights, $ff$; shown in this instance as mounted on an extension of the finger-bar, but which, in practice, will be located on the frame of the machine in such manner as to bring the treadle into convenient position to be operated by the driver on his seat. K is a perforated lever at the platform-end of the rock-shaft, to which the forward end of pitman L is connected in any convenient manner, and which at its rear end is connected to the arm or lever F. The arms F and K are provided with perforations, and the pitman L is also provided with a series of perforations at one end, as shown in fig. 2, or it may be similarly perforated at both ends to admit of the adjustment of the length of pitman or the throw of lever F, and consequently of the platform C operated thereby.

$C^1$ is a hinged folding extension or tail-piece, which is connected to the rear edge of the platform C by means of hinges, $a^7$, which allow said tail-piece to be folded over upon the platform in position shown in fig. 4, and in full lines, fig. 1, but which, where the grain is tall, and would be liable to overhang the platform and catch upon the stubble, permit said tail-piece to be turned into the position shown in fig. 3, and in dotted lines, fig. 1, thereby forming an extension of and giving the necessary width to the platform. $g$ is a rod or guard, secured to the platform in position to cover the forward edge of the extension or tail-piece when in its folded position, and which, when the platform is extended to adapt it to use in tall grain, as shown in fig. 3, serves to diminish the frictional resistance to the discharge of the grain.

The rod $g$ may have a scalloped plate or teeth, $g^1$, connected to it, as shown in figs. 1 and 3, to adapt it to side-hill work, where, from the inclined position of the platform, the grain would be liable to slide down to one side or end thereof. Where the teeth are thus applied, the rod $g$ is so connected to the platform as to be free to turn in its bearings or fastenings thereon, and is provided at one end with a bent arm or lever, $g^2$. $h$ is an arm, attached at one end to the support H, and provided at its opposite end with a pin, $h'$, which, when the arm $h$ is properly adjusted on support H, strikes underneath arm $g^2$, and raises the teeth $g^1$, when the platform is in position to receive the falling grain, into a vertical, or nearly vertical position, shown in dotted lines, fig. 3, but which, when the platform is tilted to discharge the gavel, allows the teeth to fall and lie upon the platform in such manner as not to interfere with the discharge of the grain, nor with action of the anti-friction rod.

From the foregoing description of the construction, it will be seen that through the medium of the slotted adjustable supports or arms D and H, at the opposite ends of the tilting-platform, said platform may be adjusted in height, or in its angle of relation to the cutting-apparatus and ground, or it may be set nearer to or further from the cutting-apparatus, to adapt it to the kind of grain to be cut, or to the character of the surface of the ground over which it passes.

Fig. 2 shows the operation of the tilting-platform when adapted for use in ordinary grain, and in fig. 3 the platform is represented in four different positions relative to the cutting-apparatus and ground, when the hinged extension is used and the machine adapted for use in very tall or heavy grain.

The pivot or fulcrum upon which the platform turns, being located at or near the rear edge of said platform, the operation of the same in discharging the grain is not liable to be interfered with by the passage of the platform over stumps, stones, or other obstacles, for instead of being dropped at its rear edge to give it the necessary angle of inclination to cause the grain to slide off, as is usually done, the forward edge is raised to the required height for that purpose, and is thereby made to serve the additional purpose of acting as a cut-off to receive and hold the falling grain while the completed gavel is being discharged.

The arrangement of the hinges of the tail-piece, as shown and described, is such as, when in use, to admit of a partial folding action thereof when striking the ground or an obstruction, thereby preventing its interfering with the necessary movement of the platform, as shown in fig. 3.

By the arrangement of levers and connections, shown and described, a positive movement is given in both directions to the platform, as follows, viz: By pressing down upon the toe of the foot-piece or treadle I, the platform, with the gavel resting thereon, is raised or tilted into position shown in full lines, fig. 4, and by pressing down upon the heel of said treadle I, the platform is forced back, against the resistance of the grain accumulated upon its forward edge, into proper position to receive the falling grain, as shown in dotted lines, fig. 4.

What I claim as my invention, is—

1. A tilting-platform or dropper turning upon an axis at or near its rear edge, in combination with a hinged extension or tail-piece for adapting said platform for use in tall grain.

2. A hinged folding extension or tail-piece, in combination with an anti-friction rod or guard on the platform, for the purpose as described.

3. The anti-friction rod, in combination with the tilting-platform provided with teeth, operating as and for the purpose described.

4. A tilting-platform or dropper turning on a pivot or fulcrum at or near its rear edge, operated by means of a lever-crank or arm attached to said pivot or fulcrum, substantially as described.

5. A tilting-platform or dropper turning upon a pivot or fulcrum located at or near its rear edge, in combination with arm or lever F attached to said fulcrum, adjustable rod L, arm or lever K, rock-shaft J, and foot-piece or treadle I, substantially as described.

6. A tilting-platform, in combination with a means for adjusting said platform and setting it up or down, or nearer to or further from the cutting-apparatus.

7. The adjustable arm D' forming the support for the pivot at the inner end of the tilting-platform, substantially as described.

8. The adjustable swinging arm or support H, in combination with the hook-pivot or fulcrum G at the outer end of the tilting-platform, substantially as described.

In testimony whereof, I have hereunto set my hand, this twenty-second day of March, 1867.

J. W. BOPE.

Witnesses:
    EDM. F. BROWN,
    CHRIS. JOURGENSEN.